United States Patent
Nishino et al.

(10) Patent No.: US 12,085,298 B2
(45) Date of Patent: *Sep. 10, 2024

(54) ENVIRONMENTAL EQUIPMENT CONTROL APPARATUS AND ENVIRONMENTAL EQUIPMENT CONTROL SYSTEM

(71) Applicant: DAIKIN INDUSTRIES, LTD., Osaka (JP)

(72) Inventors: Atsushi Nishino, Osaka (JP); Satoshi Hashimoto, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/871,248

(22) Filed: Jul. 22, 2022

(65) Prior Publication Data

US 2022/0357064 A1    Nov. 10, 2022

Related U.S. Application Data

(62) Division of application No. 17/260,145, filed as application No. PCT/JP2019/028936 on Jul. 24, 2019, now Pat. No. 11,428,431.

(30) Foreign Application Priority Data

Jul. 24, 2018    (JP) ................................ 2018-138871

(51) Int. Cl.
*F24F 11/00*    (2018.01)
*F24F 11/58*    (2018.01)
(Continued)

(52) U.S. Cl.
CPC ............ *F24F 11/58* (2018.01); *F24F 11/755* (2018.01); *F24F 11/79* (2018.01); *F24F 11/80* (2018.01);
(Continued)

(58) Field of Classification Search
CPC .......... F24F 11/755; F24F 11/79; F24F 11/80; G05B 13/021
See application file for complete search history.

(56) References Cited

U.S. PATENT DOCUMENTS 5,775,406 A * 7/1998 Ghitea, Jr. ............. B60H 1/008
                                                         236/94
9,290,174 B1    3/2016 Zagorski
(Continued)

FOREIGN PATENT DOCUMENTS

DE    10 2006 006 436 A1    8/2007
JP         4-118319 A        4/1992
(Continued)

OTHER PUBLICATIONS

International Preliminary Report of corresponding PCT Application No. PCT/JP2019/028936 dated Feb. 4, 2021.
(Continued)

*Primary Examiner* — Mark A Connolly
(74) *Attorney, Agent, or Firm* — Global IP Counselors, LLP

(57) ABSTRACT

An environmental equipment control apparatus controls environmental equipment. The environmental equipment control apparatus includes a grasping unit that grasps physical-and-mental-state information about a physical and mental state of a user, a control unit that changes a control state of the environmental equipment in a case in which the physical-and-mental-state information satisfies a predetermined state condition, and a storage unit that stores correspondence information in which changes in the control state of the environmental equipment are associated with changes in the physical-and-mental-state information of the user grasped by the grasping unit in accordance with the changes in the control state of the environmental equipment.

16 Claims, 3 Drawing Sheets

(51) Int. Cl.
    *F24F 11/755*    (2018.01)
    *F24F 11/79*    (2018.01)
    *F24F 11/80*    (2018.01)
    *G05B 13/00*    (2006.01)
    *G05B 13/02*    (2006.01)
    *F24F 110/10*    (2018.01)
    *F24F 110/20*    (2018.01)
    *F24F 110/70*    (2018.01)
    *F24F 120/20*    (2018.01)

(52) U.S. Cl.
    CPC ........ *G05B 13/021* (2013.01); *F24F 2110/10* (2018.01); *F24F 2110/20* (2018.01); *F24F 2110/70* (2018.01); *F24F 2120/20* (2018.01)

(56) References Cited

U.S. PATENT DOCUMENTS

| | | | |
|---|---|---|---|
| 11,428,431 B2 * | 8/2022 | Nishino | B60H 1/00814 |
| 2003/0096593 A1 | 5/2003 | Naboulsi | |
| 2009/0255645 A1 | 10/2009 | Ladstaetter | |
| 2010/0202658 A1 * | 8/2010 | Ishida | G06V 20/597 |
| | | | 340/576 |
| 2016/0054023 A1 | 2/2016 | Baker et al. | |
| 2017/0020432 A1 | 1/2017 | Kusukame et al. | |
| 2017/0116952 A1 * | 4/2017 | Wang | G06F 3/011 |
| 2018/0236941 A1 * | 8/2018 | Biesinger | B60R 1/12 |
| 2018/0321700 A1 * | 11/2018 | Kwak | F24F 11/80 |
| 2018/0365961 A1 * | 12/2018 | Katsuhara | G08B 21/06 |
| 2020/0240670 A1 | 7/2020 | Kitagawa et al. | |

FOREIGN PATENT DOCUMENTS

| | | | |
|---|---|---|---|
| JP | H0718958 U | * | 4/1995 |
| JP | 2005-75198 A | | 3/2005 |
| JP | 2005-212667 A | | 8/2005 |
| JP | 2009-90876 A | | 4/2009 |
| JP | 2009-202841 A | | 9/2009 |
| JP | 2012-1056 A | | 1/2012 |
| JP | 2017-148604 A | | 8/2017 |
| KR | 20030057491 A | * | 7/2003 |

OTHER PUBLICATIONS

European Search Report of corresponding EP Application No. 19 84 1760.2 dated Mar. 28, 2022.

* cited by examiner

ENVIRONMENTAL EQUIPMENT CONTROL APPARATUS AND ENVIRONMENTAL EQUIPMENT CONTROL SYSTEM

CROSS-REFERENCE TO RELATED APPLICATIONS

This application is a divisional application of U.S. patent application Ser. No. 17/260,145, filed on Jan. 13, 2021, which is a U.S. National stage application of International Application PCT/JP2019/028936, having an international filing date of Jul. 24, 2019, which claims priority under 35 U.S.C. § 119(a) to Japanese Patent Application No. 2018-138871, filed in Japan on Jul. 24, 2018, the entire contents of which are hereby incorporated herein by reference.

BACKGROUND

Field of the Invention

The present disclosure relates to an environmental equipment control apparatus and an environmental equipment control system.

Background Information

Hitherto, an environment of a space where a user is present has been controlled by using an air conditioning apparatus or the like. For example, in the apparatus described in Japanese Unexamined Patent Application Publication No. 04-118319, it is proposed that temporary control is performed to increase the amount of air to be blown out while a blow-out temperature supplied to the upper half body of a passenger is decreased on the basis of the difference between a set temperature and a vehicle indoor temperature, so as to relieve sleepiness of the passenger.

SUMMARY

The above-described conventional apparatus estimates a situation such as sleepiness of the user on the basis of the difference between the set temperature and the vehicle indoor temperature. However, a state in which the difference between the set temperature and the vehicle indoor temperature satisfies a predetermined condition does not necessarily lead to a state in which the user is sleepy.

The problem of the present disclosure has been made in view of the above-described points and is directed to providing an environmental equipment control apparatus and an environmental equipment control system that are capable of relieving sleepiness of a user.

Solution to Problem

An environmental equipment control apparatus according to a first aspect is an environmental equipment control apparatus for controlling environmental equipment and includes a grasping unit, a control unit and a storage unit. The grasping unit grasps physical-and-mental-state information about a physical and mental state of a user. The control unit changes a control state of the environmental equipment in a case where the physical-and-mental-state information satisfies a predetermined state condition. The storage unit stores correspondence information in which changes in the control state of the environmental equipment are associated with changes in the physical-and-mental-state information of the user grasped by the grasping unit in accordance with the changes in the control state of the environmental equipment. The control unit is capable of changing a manner of changing the control state of the environmental equipment every time the physical-and-mental-state information satisfies the predetermined state condition, selecting a change satisfying a predetermined change condition from among the changes in the physical-and-mental-state information of the user, and executing a change in the control state of the environmental equipment stored in association with the selected change.

The physical-and-mental-state information about the physical and mental state of the user is not limited, and various types of information may be used, for example, a drowsiness scale, the degree of arousal, an autonomic nerve balance such as LF/HF, the degree of sleepiness, the degree of tension, the degree of sweating, a body temperature, a temperature on a body surface, voice, and the like.

Here, the degree of arousal is not limited, but may be, for example, determined on the basis of the state of heartbeats of the user, the temperature of a skin of the user, the number of times of breathing per unit time of the user, brain waves of the user, or a combination thereof.

In this environmental equipment control apparatus, it is possible to relieve sleepiness of the user and to select and execute control details which are actually effective for relieving sleepiness among past control operations.

An environmental equipment control apparatus according to a second aspect is the environmental equipment control apparatus according to the first aspect, in which the control unit restores the control state of the environmental equipment to a state before change within a predetermined change time period after changing the control state of the environmental equipment.

In this environmental equipment control apparatus, it is possible to suppress uncomfortableness of the user caused by the control for relieving sleepiness.

An environmental equipment control apparatus according to a third aspect is the environmental equipment control apparatus according to the second aspect, in which the predetermined change time period is 30 minutes or less.

In this environmental equipment control apparatus, it is possible to more reliably suppress uncomfortableness of the user caused by the control for relieving sleepiness.

An environmental equipment control apparatus according to a fourth aspect is the environmental equipment control apparatus according to the second aspect or the third aspect, in which the environmental equipment includes an air conditioning apparatus capable of changing a temperature of a space where the user is present. In a case where the physical-and-mental-state information satisfies the predetermined state condition, the control unit causes the air conditioning apparatus to operate with a set temperature being decreased and then causes the air conditioning apparatus to operate with the set temperature that is a set temperature before being changed.

In this environmental equipment control apparatus, it is possible to suppress uncomfortableness of the user caused by the change in temperature by the control for relieving sleepiness.

An environmental equipment control apparatus according to a fifth aspect is the environmental equipment control apparatus according to the fourth aspect, in which in a case where the physical-and-mental-state information satisfies the predetermined state condition, the control unit causes the air conditioning apparatus to operate with the set temperature being decreased by a predetermined temperature value and then the control unit repeats a process of causing the air conditioning apparatus to operate with the set temperature being increased by a temperature value smaller than the predetermined temperature value until the set temperature is back to the previous set temperature that is a set temperature before being decreased.

In this environmental equipment control apparatus, sleepiness of the user can be easily relieved by performing operation in a state in which the set temperature is decreased by the predetermined temperature value, which is the control with a greater change in the set temperature per unit time than in the case of back to the set temperature that is a set temperature before being changed.

An environmental equipment control apparatus according to a sixth aspect is the environmental equipment control apparatus according to the fourth aspect or the fifth aspect, in which in a case where the physical-and-mental-state information satisfies the predetermined state condition, the control unit increases a degree of decrease in the set temperature of the air conditioning apparatus more as an outdoor temperature decreases.

In this environmental equipment control apparatus, when the outdoor temperature is low, the user has adapted to the low-temperature environment, and the set temperature is significantly decreased at such a time, so that sleepiness can be more reliably relieved.

An environmental equipment control apparatus according to a seventh aspect is the environmental equipment control apparatus according to any one of the fourth aspect to the sixth aspect, in which the air conditioning apparatus is capable of adjusting a blow-out direction of conditioned air. In a case where the physical-and-mental-state information satisfies the predetermined state condition, the control unit controls the blow-out direction of the conditioned air of the air conditioning apparatus to a predetermined downward state in a case of causing the air conditioning apparatus to operate with the set temperature being decreased.

In this environmental equipment control apparatus, sleepiness can be easily relieved by particularly decreasing the temperature of a lower-half body of the user.

An environmental equipment control apparatus according to an eighth aspect is the environmental equipment control apparatus according to any one of the fourth aspect to the seventh aspect, in which the air conditioning apparatus is capable of changing a speed of conditioned air to be supplied to the user. The control unit controls the air conditioning apparatus to cause variation in the speed of the conditioned air to be supplied to the user when starting changing the control state of the environmental equipment in response to the physical-and-mental-state information satisfying the predetermined state condition.

In this environmental equipment control apparatus, sleepiness of the user is more reliably relieved by causing variation in air speed at the same time of decreasing the set temperature.

An environmental equipment control apparatus according to a ninth aspect is the environmental equipment control apparatus according to any one of the fourth aspect to the eighth aspect, in which the air conditioning apparatus is capable of changing a humidity of the space where the user is present. The control unit decreases a set humidity of the air conditioning apparatus when starting changing the control state of the environmental equipment in response to the physical-and-mental-state information satisfying the predetermined state condition.

In this environmental equipment control apparatus, sleepiness of the user is more reliably relieved by decreasing the humidity at the same time of decreasing the set temperature.

An environmental equipment control apparatus according to a tenth aspect is the environmental equipment control apparatus according to any one of the fourth aspect to the ninth aspect, in which the environmental equipment further includes aroma equipment that provides an aroma to the space where the user is present. The control unit causes the aroma equipment to start providing an aroma or increases an amount of aroma to be provided by the aroma equipment when starting changing the control state of the environmental equipment in response to the physical-and-mental-state information satisfying the predetermined state condition.

In this environmental equipment control apparatus, sleepiness of the user is more quickly relieved by causing the aroma equipment to start providing an aroma or increasing the amount of aroma to be provided by the aroma equipment at the same time of decreasing the set temperature.

An environmental equipment control apparatus according to an eleventh aspect is the environmental equipment control apparatus according to any one of the fourth aspect to the tenth aspect, in which the environmental equipment includes ventilating equipment capable of ventilating the space where the user is present. The control unit increases a ventilation amount of the ventilating equipment when starting changing the control state of the environmental equipment in response to the physical-and-mental-state information satisfying the predetermined state condition.

In this environmental equipment control apparatus, sleepiness of the user is more reliably relieved by increasing the ventilation amount of the ventilating equipment at the same time of decreasing the set temperature.

An environmental equipment control apparatus according to a twelfth aspect is the environmental equipment control apparatus according to any one of the fourth aspect to the eleventh aspect, in which the environmental equipment includes illuminating equipment capable of changing an illuminance of the space where the user is present. The control unit increases an illuminance of the illuminating equipment when starting changing the control state of the environmental equipment in response to the physical-and-mental-state information satisfying the predetermined state condition.

In this environmental equipment control apparatus, sleepiness of the user is more quickly relieved by increasing the illuminance of the illuminating equipment at the same time of decreasing the set temperature.

An environmental equipment control apparatus according to a thirteenth aspect is the environmental equipment control apparatus according to any one of the fourth aspect to the twelfth aspect, in which the environmental equipment includes illuminating equipment capable of changing a color temperature of the space where the user is present. The control unit increases a color temperature of the illuminating equipment when starting changing the control state of the environmental equipment in response to the physical-and-mental-state information satisfying the predetermined state condition.

In this environmental equipment control apparatus, sleepiness of the user is more quickly relieved by increasing the color temperature of the illuminating equipment at the same time of decreasing the set temperature.

An environmental equipment control apparatus according to a fourteenth aspect is the environmental equipment control apparatus according to any one of the first aspect to the thirteenth aspect, in which the physical-and-mental-state information includes a drowsiness scale of the user.

In this environmental equipment control apparatus, it is possible to more reliably relieving sleepiness of the user.

An environmental equipment control apparatus according to a fifteenth aspect is the environmental equipment control apparatus according to the fourteenth aspect, in which in a case where the drowsiness scale of the user is greater than or equal to a predetermined sleepiness reference value, the control unit changes the control state of the environmental equipment.

An environmental equipment control system according to a sixteenth aspect includes the environmental equipment control apparatus according to any one of the first aspect to the fifteenth aspect, and the environmental equipment.

DETAILED DESCRIPTION OF EMBODIMENT(S)

Hereinafter, a description will be given of an environmental equipment control system adopting an environmental equipment control apparatus by taking one embodiment as an example, but the content of the present disclosure is not limited thereto.

(1) Schematic Configuration of Entire Environmental Equipment Control System

Figure 1:
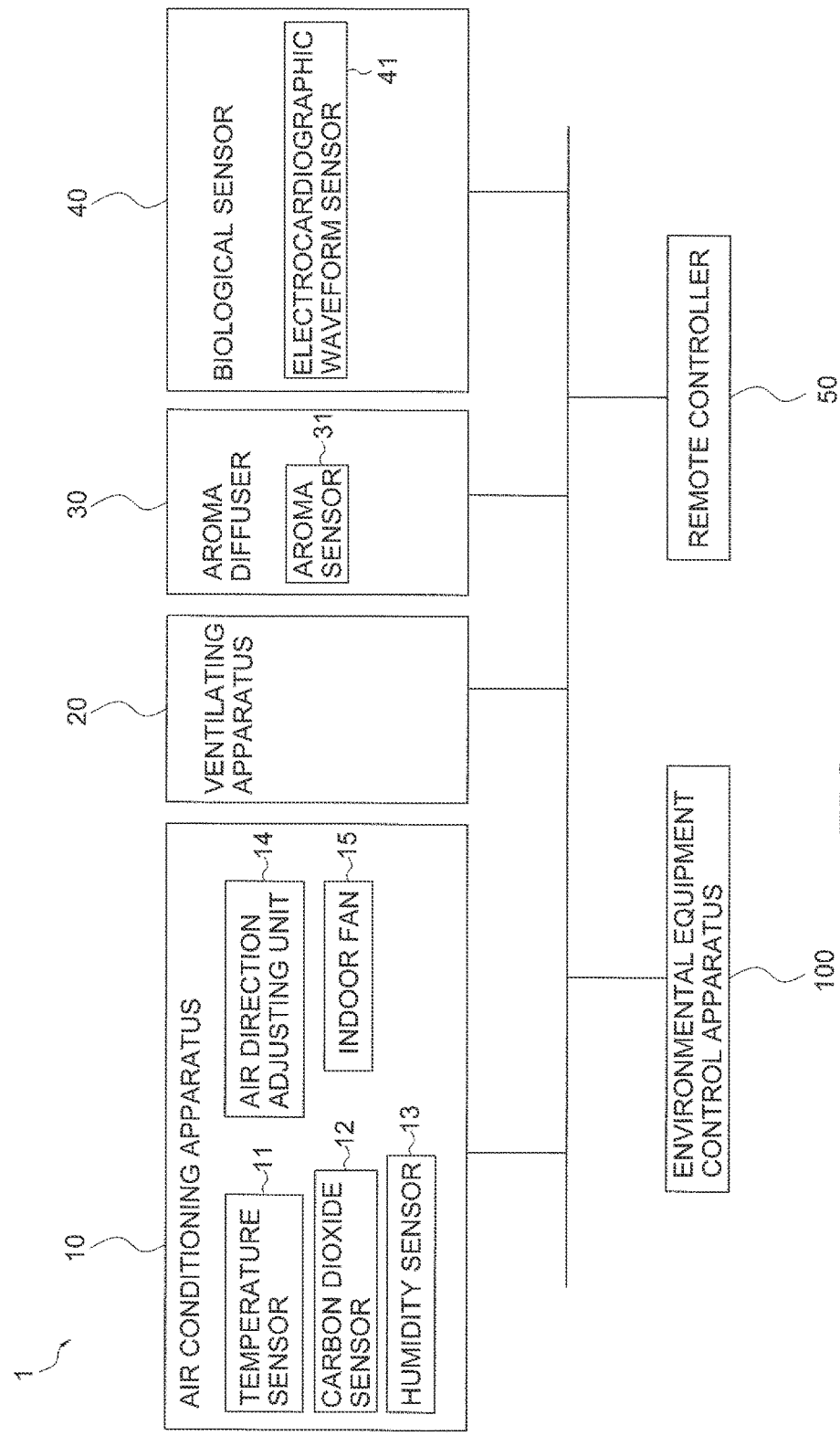
FIG. 1 is a schematic configuration diagram of an entire environmental equipment control system.

FIG. 1 illustrates a schematic configuration diagram of an entire environmental equipment control system 1.

The environmental equipment control system 1 is a system for suppressing sleepiness or the like, which is the physical and mental state of a user, by controlling environmental equipment.

The environmental equipment control system 1 mainly includes an air conditioning apparatus 10, a ventilating apparatus 20, an aroma diffuser 30, a biological sensor 40, a remote controller 50, and an environmental equipment control apparatus 100. These apparatuses are connected to each other in a wired or wireless manner so as to be capable of communicating with each other.

The air conditioning apparatus 10, the ventilating apparatus 20, and the aroma diffuser 30 are pieces of environmental equipment of different types and are pieces of equipment capable of controlling the degree of arousal of the user.

The air conditioning apparatus 10 is an apparatus capable of adjusting a temperature in a room where the user is present, and includes a refrigerant circuit capable of implementing a refrigeration cycle using a compressor, a condenser, an expansion valve, and an evaporator connected to each other, with an outdoor unit and an indoor unit, which are not illustrated, being connected to each other. The air conditioning apparatus 10 includes a temperature sensor 11 that detects an air temperature in the room, a carbon dioxide sensor 12 that detects a carbon dioxide concentration in the room, and a humidity sensor 13 that detects a humidity in the room. The air conditioning apparatus 10 is capable of operating to achieve a temperature and humidity set by the user with the remote controller 50 or the like. The air conditioning apparatus 10 is provided with an air direction adjusting unit 14 capable of adjusting, in a plurality of steps, the direction of conditioned air to be sent into the room. Specifically, the air direction adjusting unit 14 is provided at a blow-out port of the indoor unit and may be an air direction adjusting louver or the like whose position is controllable. Furthermore, in the air conditioning apparatus 10, an indoor fan 15 is provided inside the indoor unit, and adjusting of the rotation rate thereof makes it possible to adjust an air volume or cause variation in the speed of conditioned air to be blown out.

The ventilating apparatus 20 is an apparatus capable of ventilating the room where the user is present, and is capable of adjusting a carbon dioxide concentration in the room by ventilating the room using ON/OFF control. The ventilating apparatus 20 includes a fan, a ventilation duct, and the like.

The aroma diffuser 30 is an apparatus capable of supplying a predetermined aromatic substance into the room where the user is present, and is capable of adjusting an aroma concentration in the room using ON/OFF control. The type of aromatic substance is not limited, but may preferably be an aroma having an influence on the degree of arousal of the user. The aroma diffuser 30 includes an aroma sensor 31 that detects the aroma concentration in the room.

The biological sensor 40 is a sensor for estimating a drowsiness scale of the user, and includes an electrocardiographic waveform sensor 41 that detects an electrocardiographic waveform of the user in this embodiment. The electrocardiographic waveform sensor 41 is used by being attached near the heart of the user, and is capable of wirelessly transmitting detected electrocardiographic waveform data to a nearby apparatus, such as the environmental equipment control apparatus 100.

The remote controller 50 receives from the user various types of input data to be used in the environmental equipment control system 1. The remote controller 50 is configured to be capable of operating the air conditioning apparatus 10, the ventilating apparatus 20, and the aroma diffuser 30. The remote controller 50 is capable of receiving from the user a selection of a normal control mode or a sleepiness suppression control mode. In the normal control mode, the air conditioning apparatus 10 or the like is constantly subjected to operation control to achieve a set temperature or the like. The control to be performed in a case where the sleepiness suppression control mode is selected will be described below.

The environmental equipment control apparatus 100 is an apparatus for controlling various types of environmental equipment to relieve sleepiness of the user, as will be described below.

(2) Configuration of Environmental Equipment Control Apparatus 100

Figure 2:
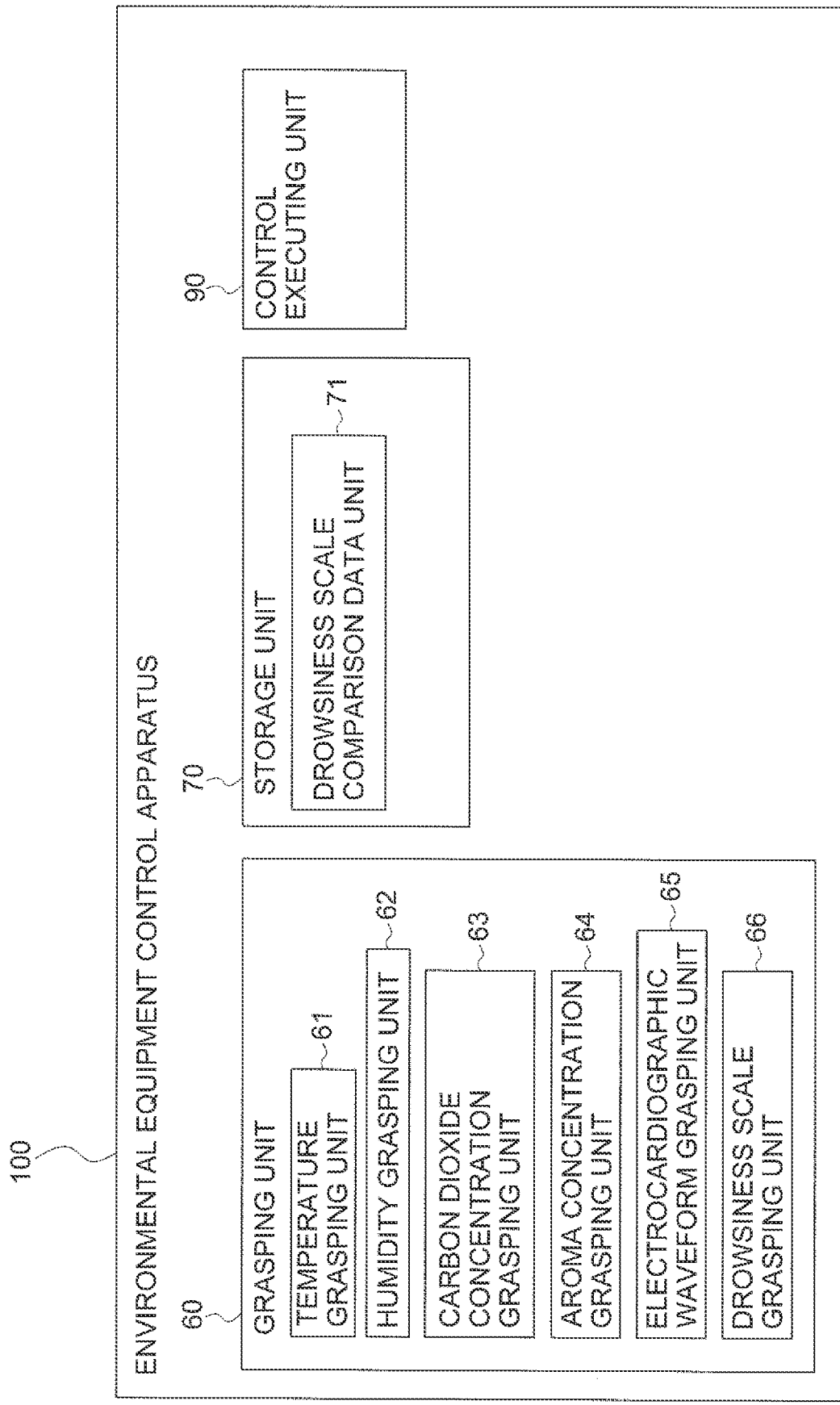
FIG. 2 is a block configuration diagram of an environmental equipment control apparatus.

FIG. 2 illustrates a functional block configuration diagram of the environmental equipment control apparatus 100.

The environmental equipment control apparatus 100 includes a grasping unit 60 for grasping various types of information, a storage unit 70 for storing various types of data, and a control executing unit 90. The environmental equipment control apparatus 100 is capable of obtaining information from the biological sensor 40 and the remote controller 50 and controlling the air conditioning apparatus 10, the ventilating apparatus 20, and the aroma diffuser 30, and includes one or a plurality of CPUs, ROMs, and RAMs.

(2-1) Grasping Unit 60

The grasping unit 60 includes a temperature grasping unit 61, a humidity grasping unit 62, a carbon dioxide concentration grasping unit 63, an aroma concentration grasping unit 64, an electrocardiographic waveform grasping unit 65, a drowsiness scale grasping unit 66, and the like, and is constituted by one or a plurality of CPUs, RAMs, and the like.

The temperature grasping unit 61 obtains, through communication, a value detected by the temperature sensor 11 of the air conditioning apparatus 10 and grasps the value as a temperature in the room where the user is present.

The humidity grasping unit 62 obtains, through communication, a value detected by the humidity sensor 13 of the air conditioning apparatus 10 and grasps the value as a humidity in the room where the user is present.

The carbon dioxide concentration grasping unit 63 obtains, through communication, a value detected by the carbon dioxide sensor 12 of the air conditioning apparatus 10 and grasps the value as a carbon dioxide concentration in the room where the user is present.

The aroma concentration grasping unit 64 obtains, through communication, a value detected by the aroma sensor 31 of the aroma diffuser 30 and grasps the value as an aroma concentration in the room where the user is present.

The electrocardiographic waveform grasping unit 65 grasps electrocardiographic waveform data detected by the electrocardiographic waveform sensor 41.

The drowsiness scale grasping unit 66 refers to a drowsiness scale comparison data unit 71 stored in the storage unit 70, which will be described below, on the basis of information detected by the electrocardiographic waveform sensor 41 as the biological sensor 40, thereby grasping a drowsiness scale of the user.

(2-2) Storage Unit 70

The storage unit 70 includes the drowsiness scale comparison data unit 71 or the like, and is constituted by one or a plurality of ROMs, RAMs, and the like.

As described above, the drowsiness scale comparison data unit 71 stores in advance data for grasping a drowsiness scale from the information detected by the electrocardiographic waveform sensor 41 as the biological sensor 40. More specifically, the drowsiness scale corresponding to the electrocardiographic waveform grasped from the electrocardiographic waveform sensor 41 is specified by referring to data indicating the relationships between electrocardiographic waveforms and drowsiness scale stored in advance (the relationships between electrocardiographic waveforms and drowsiness scale are predetermined on the basis of known matters), and thereby the drowsiness scale of the user is grasped.

The drowsiness scale are evaluation values in five stages, 1: not sleepy at all, 2: a little sleepy, 3: sleepy, 4: quite sleepy, and 5: very sleepy, each of which corresponds to an electrocardiographic waveform.

(2-3) Control Executing Unit 90

The control executing unit 90 controls each piece of environmental equipment on the basis of the information grasped by the grasping unit 60 and is constituted by one or a plurality of CPUs, RAMs, and the like.

(3) Process of Sleepiness Suppression Control Mode of Environmental Equipment Control Apparatus 100

Figure 3:
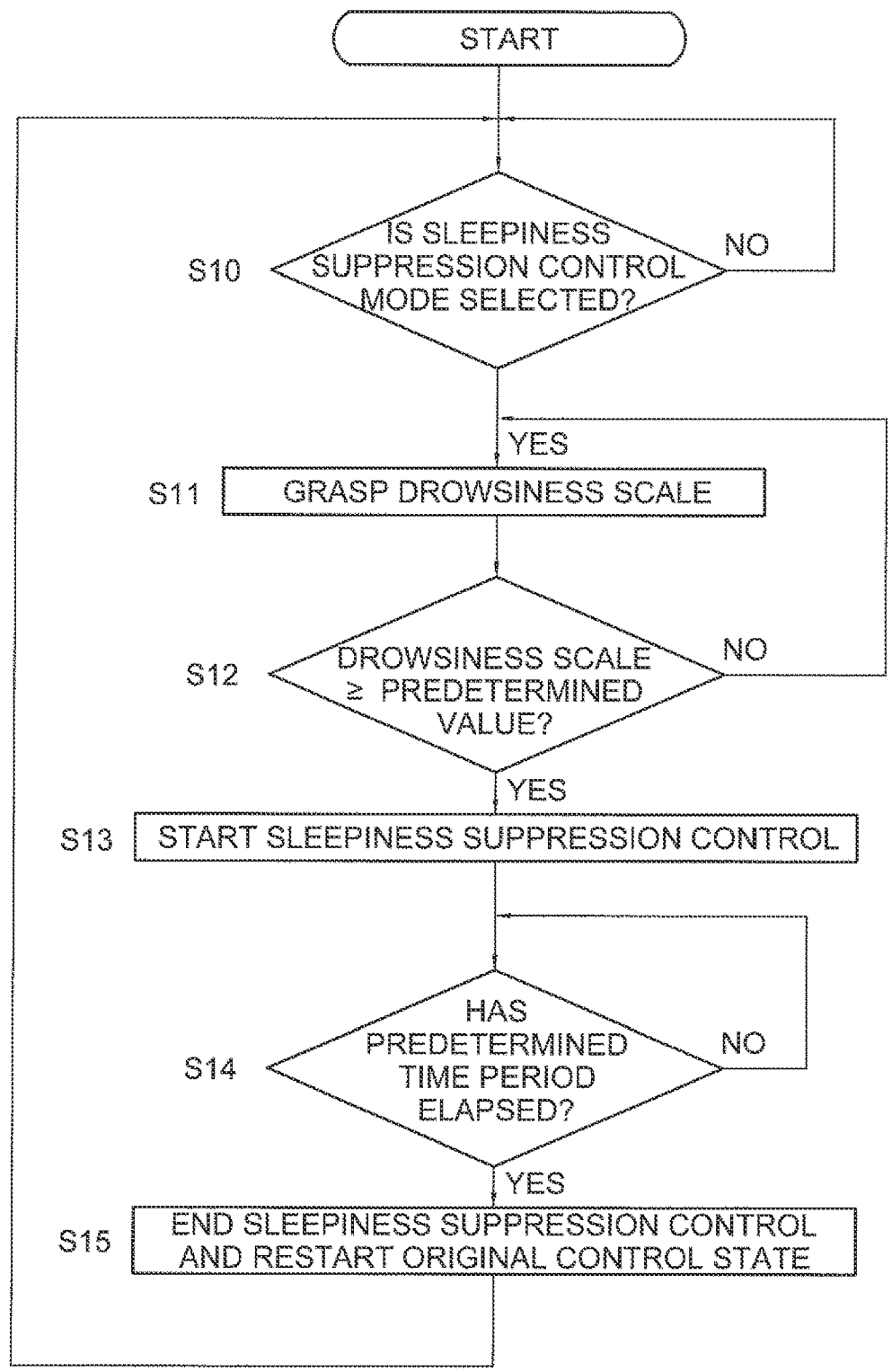
FIG. 3 is a flowchart of a sleepiness suppression control mode of the environmental equipment control apparatus.

FIG. 3 illustrates a flowchart of the sleepiness suppression control mode of the environmental equipment control apparatus 100.

In step S10, the control executing unit 90 determines whether a control mode accepted by the remote controller 50 is not the normal control mode but the sleepiness suppression control mode. Here, if an instruction of the sleepiness suppression control mode is accepted, the process proceeds to step S11. If an instruction of the normal control mode is accepted, execution of the normal control mode is continued.

In step S11, the drowsiness scale grasping unit 66 grasps a drowsiness scale. Specifically, the drowsiness scale grasping unit 66 grasps the drowsiness scale corresponding to the electrocardiographic waveform detected by the electrocardiographic waveform sensor 41 by referring to the data stored in the drowsiness scale comparison data unit 71 of the storage unit 70.

In step S12, the control executing unit 90 determines whether or not the drowsiness scale grasped by the drowsiness scale grasping unit 66 is greater than or equal to a predetermined sleepiness reference value (for example, 2.0). Here, if the drowsiness scale is greater than or equal to the predetermined sleepiness reference value, the process proceeds to step S13. If the drowsiness scale is smaller than the predetermined sleepiness reference value, the process returns to step S11, where a drowsiness scale is obtained again.

In step S13, the control executing unit 90 starts sleepiness suppression control.

Specifically, the control executing unit 90 starts controlling the air conditioning apparatus 10 by changing control details so as to decrease the current set temperature by a predetermined value (for example, 3° C.), decrease the current set humidity by a predetermined value (for example, 20%), and change the current blow-out direction of conditioned air downward by a plurality of steps, and cause variation in the speed of air blown from the indoor fan 15.

In addition, the control executing unit 90 starts controlling the ventilating apparatus 20 by changing control details so as to increase the current ventilation amount by a predetermined amount (when the ventilating apparatus 20 is stopped, the driving thereof is started so that the ventilation amount becomes a predetermined amount, and when the ventilating apparatus 20 is being driven, the driving thereof is performed so that the ventilation amount is increased by a predetermined amount).

Furthermore, the control executing unit 90 starts controlling the aroma diffuser 30 by changing control details so as to increase the current aroma concentration grasped from the aroma sensor 31 by a predetermined percentage (when the aroma diffuser 30 is stopped, the driving thereof is started so that the aroma concentration becomes a predetermined percentage, and when the aroma diffuser 30 is being driven, the driving thereof is performed so that the aroma concentration is increased by a predetermined percentage).

In step S14, the control executing unit 90 determines whether or not a predetermined time period has elapsed from the start of the sleepiness suppression control in step S13. Here, if the predetermined time period has elapsed, the process proceeds to step S15. If the predetermined time period has not elapsed, the sleepiness suppression control is continued. Here, the length of the predetermined time period is not limited and may be, for example, 3 minutes or more and 30 minutes or less, or 5 minutes or more and 10 minutes or less. The length of the predetermined time period may also be settable by a user via the remote controller 50 or the like.

In step S15, the control executing unit 90 ends the sleepiness suppression control and restarts the original control state that had been executed until immediately before step S13. Specifically, the set temperature, set humidity, and so forth of the air conditioning apparatus 10, the ventilation amount of the ventilating apparatus 20, and the aroma concentration of the aroma diffuser 30 are restored to the original setting states, and then control is restarted. Subsequently, the process returns to step S10 and the process is repeated.

(4) Characteristics of Embodiment 4-1

The environmental equipment control apparatus 100 according to this embodiment starts sleepiness suppression control when the drowsiness scale of a user increases and the user is estimated to be sleepy, thereby being capable of suppressing the sleepiness of the user.

4-2

The sleepiness suppression control started by the environmental equipment control apparatus 100 according to this embodiment causes an environment set by the user, such as a set temperature and a set humidity, to be temporarily lost, but the sleepiness suppression control is not performed beyond the predetermined time period. Thus, it is possible to prevent the sleepiness suppression control from making the user feel excessively uncomfortable, while suppressing sleepiness of the user.

4-3

The environmental equipment control apparatus 100 according to this embodiment not only decreases the set temperature and set humidity of the air conditioning apparatus 10 but also changes the ventilation amount of the ventilating apparatus 20 and the aroma concentration of the aroma diffuser 30 when starting sleepiness suppression control. Thus, it is possible to suppress sleepiness of the user more reliably. In addition, a change in aroma concentration caused by spraying aroma from the aroma diffuser 30 is more likely to quickly produce an effect on the user in a short time period than a change in room temperature caused by blowing out of temperature adjusting air from the air conditioning apparatus 10. Thus, it is possible to suppress sleepiness of the user in a relatively early stage from the start of sleepiness suppression control. In particular, if the drowsiness scale once increases excessively, it may be impossible to reduce the sleepiness only by controlling the environmental equipment. However, in the example of this embodiment, it is possible to reduce the sleepiness of the user before the sleepiness increases excessively.

4-4

The environmental equipment control apparatus 100 according to this embodiment ends sleepiness suppression control in the predetermined time period and performs control to restore the control state to the original control state. When the duration of the sleepiness suppression control is a short time period, for example, 10 minutes or less, it is possible to prevent the user from adapting to the change in environment for the sleepiness suppression control. That is, it is possible to obtain an effect of appropriately suppressing sleepiness every time the sleepiness suppression control is performed.

(5) Modification Examples

While an exemplary embodiment of the present disclosure has been described in the above embodiment, the above embodiment does not intend to limit the content of the present disclosure, and the present disclosure is not limited to the above embodiment. The content of the present disclosure reasonably includes an embodiment appropriately changed without deviating from the gist of the present disclosure.

The above embodiment and a plurality of modification examples described below may be appropriately combined such that a mutual inconsistency does not arise.

(5-1) Modification Example A

In the above embodiment, a description has been given of, as an example, the case of decreasing the set temperature of the air conditioning apparatus 10 by a predetermined value in the case of performing sleepiness suppression control.

Regarding this, the degree of decrease in the set temperature of the air conditioning apparatus 10 in the case of performing sleepiness suppression control may be changed on the basis of, for example, an outdoor temperature at that time (it may be grasped from an outdoor temperature sensor equipped in the outdoor unit or the like). Specifically, it is preferable that the control executing unit 90 perform control so that the degree of decrease in the set temperature of the air conditioning apparatus 10 in the case of performing sleepiness suppression control increases more as the outdoor temperature decreases.

Accordingly, it is possible to suppress sleepiness of a user more reliably even when the user's body has adapted to a low temperature.

When the control executing unit 90 performs control so that the degree of decrease in the set temperature of the air conditioning apparatus 10 in the case of performing sleepiness suppression control decreases as the outdoor temperature increases, it is possible to reduce discomfort that can be felt by the user as a result of the sleepiness suppression control.

(5-2) Modification Example B

In the above embodiment, a description has been given of, as an example, the case of restarting the original control state after sleepiness suppression control is continuously performed for a predetermined time period.

Regarding this, for example, the settings of the air conditioning apparatus 10, the ventilating apparatus 20, and the aroma diffuser 30 may be significantly changed at one time at the start of sleepiness suppression control, and the settings may be stepwisely back to the original settings over time when the sleepiness suppression control is to be ended. Specifically, the set values of the set temperature and set humidity of the air conditioning apparatus 10, the ventilation amount of the ventilating apparatus 20, and the aroma concentration of the aroma diffuser 30 are changed at the same time as the start of sleepiness suppression control. When the sleepiness suppression control is to be ended, the operation state may be back to the previous state by repeating the stepwisely changing of the set value of the operations each being continued for only a predetermined short time period until the set values are back to the previous value. Although not limited, the ratio between the duration of control in the starting state of sleepiness suppression control and the duration of control required to end the sleepiness suppression control may be about 1:10 to 2:3.

In this way, as a result of significantly changing the environment at one time at the start of sleepiness suppression control, sleepiness of the user can be suppressed more reliably. In addition, it is possible to avoid giving a sudden change in the environment to the user at the time of ending the sleepiness suppression control.

(5-3) Modification Example C

In the above embodiment, a description has been given of, as an example, the air conditioning apparatus 10, the ventilating apparatus 20, and the aroma diffuser 30 as environmental equipment.

However, the environmental equipment is not limited thereto. For example, an illuminating apparatus may be used to adjust the illuminance in the room and change the drowsiness scale of the user. In the case of using an illuminating apparatus capable of controlling the illuminance to suppress sleepiness of the user, the illuminance may be increased (for example, bluish white light may be radiated) at the start of sleepiness suppression control. Alternatively, in the case of using an illuminating apparatus capable of controlling the color temperature to suppress sleepiness of the user, the color temperature may be increased at the start of sleepiness suppression control.

Control of the illuminance or color temperature of the illuminating apparatus is more likely to quickly produce an effect on the user in a short time period than a change in indoor temperature caused by blowing out temperature adjusting air from the air conditioning apparatus 10. Thus, it is possible to suppress sleepiness of the user in a relatively early stage after the start of sleepiness suppression control.

It has been determined that the following four types of environments have different influences on the degree of arousal of the user.

Condition 1 (constant condition): indoor set temperature is 27° C.; no aroma spray; indoor illuminance is kept constant at 700 lx for 60 minutes Condition 2 (temperature stimulation): no aroma spray; indoor illuminance is kept constant at 700 lx for 60 minutes; indoor set temperature is 27° C. for first 10 minutes, 24° C. for subsequent 30 minutes, and 27° C. for last 20 minutes Condition 3 (aroma stimulation): indoor set temperature is 27° C.; indoor illuminance is kept constant at 700 lx for 60 minutes; no aroma spray for first 10 minutes, with aroma spray for subsequent 30 minutes, and no aroma spray for last 20 minutes Condition 4 (illuminance stimulation): indoor set temperature is 27° C.: no aroma spray for 60 minutes; indoor illuminance is 150 lx for first 10 minutes, 1500 lx for subsequent 30 minutes, and 150 lx for last 20 minutes It has been determined that, in the above individual conditions, the degree of arousal increases by 0.5 points in condition 3 (aroma stimulation) and condition 4 (illuminance stimulation) compared to the case of condition 1 (constant condition). It has also been determined that the degree of arousal increases by 2.0 points in condition 2 (temperature stimulation) compared to the case of condition 1 (constant condition), and that the duration of a sleepiness suppression effect is longer in the case of condition 2 (temperature stimulation) than in the case of condition 3 (aroma stimulation) or condition 4 (illuminance stimulation).

(5-4) Modification Example D

In the above embodiment, a description has been given of, as an example, the case of grasping a drowsiness scale, which is an example of the physical and mental state of the user, on the basis of information detected by the electrocardiographic waveform sensor 41 as the biological sensor 40.

Regarding this, the physical and mental state of the user is not limited thereto. For example, various types of information, such as the degree of arousal of the user, the degree of tension of the user, the degree of sweating of the user, and the autonomic nerve balance of the user, may be used. The measurement or estimation of the degree of arousal of the user, the degree of tension of the user, the degree of sweating of the user, and the autonomic nerve balance of the user may be performed by using a known technique.

In the case of managing and evaluating an autonomic nerve balance as the physical and mental state of the user, a sympathetic nerve activity index (LF/HF ratio) calculated on the basis of a heart rate pattern or a pulse rate pattern can be used. The sympathetic nerve activity index (LF/HF) can be grasped by using a known measuring device for the user. In the case of using the sympathetic nerve activity index (LF/HF) as the physical and mental state of the user, a reliable value can be grasped as the state of the sympathetic nerve of the user, and the index can be immediately grasped by using the known measuring device. Thus, environmental equipment can be controlled in real time in accordance with the sympathetic nerve activity index (LF/HF) of the user.

These indexes can be used as an index indicating the physical and mental state of the user not only in the example described in the above embodiment but also in the example described in each modification example or the like.

(5-5) Modification Example E

In the above embodiment, a description has been given of, as an example, the case of simultaneously controlling drivings of all the pieces of environmental equipment included in the environmental equipment control system 1, that is, the air conditioning apparatus 10, the ventilating apparatus 20, and the aroma diffuser 30, in the case of performing sleepiness suppression control.

However, in the case of performing sleepiness suppression control, only a part of or only a combination of a part of the environmental equipment included in the environmental equipment control system 1 may be simultaneously driven and controlled. For example, control of the set temperature, set humidity, blow-out direction of air, and variation in air speed of the air conditioning apparatus 10, and control of the ventilation amount of the ventilating apparatus 20 may be simultaneously executed in combination, whereas the aroma diffuser 30 may be kept under current control. As for the air conditioning apparatus 10, only the set temperature and set humidity may be changed, whereas the blow-out direction of air and variation in air speed may be kept under current control. Furthermore, control may be performed to change only the set temperature of the air conditioning apparatus 10 and only the aroma concentration of the aroma diffuser 30.

In the case of executing control by selecting a combination pattern of a specific one or two or more of the plurality of control items about the plurality of pieces of environmental equipment in this manner, the control executing unit 90 may select and execute a specific control pattern randomly or in a predetermined order every time the drowsiness scale of the user becomes greater than or equal to the predetermined sleepiness reference value.

In a case where a specific control pattern has been selected and executed in this manner, the degree in which the drowsiness scale of the user has been actually improved by the execution of the control pattern may be stored in the storage unit in association with the control pattern. The environmental equipment control apparatus 100 may be configured such that the control executing unit 90 is capable of preferentially selecting and executing a control pattern that is more effective to suppress sleepiness of the user when improvement information about the drowsiness scale corresponding to the control pattern is accumulated to some extent.

Specifically, although it may be impossible to suppress sleepiness only by simply decreasing an indoor temperature in some cases, it is possible to select and execute control capable of suppressing sleepiness on the basis of a drowsiness scale as described above, and accordingly it is possible to suppress sleepiness of the user more reliably.

The embodiment of the present disclosure has been described above. It is to be understood that the embodiment and the details can be variously changed without deviating from the gist and scope of the present disclosure described in the claims.

What is claimed is:

1. An environmental equipment control apparatus for controlling environmental equipment, the environmental equipment control apparatus comprising:
    a grasping unit configured to grasp physical-and-mental-state information about a physical and mental state of a user;
    a control unit configured to change a control state of the environmental equipment in a case in which the physical-and-mental-state information satisfies a predetermined state condition, the control unit being configured to selectively execute control patterns including at least a first control pattern controlling one piece of environmental equipment, a second control pattern controlling a combination of pieces of environmental equipment, and a third control pattern controlling all the pieces of environmental control equipment; and
    a storage unit configured to store correspondence information in which each of the control patterns is associated with an actual degree of improvement of the physical-and-mental-state of the user responsive to the control pattern,
    the control unit being capable of, every time the physical-and-mental-state information satisfies the predetermined state condition:
        selecting one of the control patterns that satisfies a predetermined degree of improvement from the correspondence information, and
        executing the selected control pattern.

2. The environmental equipment control apparatus according to claim 1, wherein
    the control unit is further configured to restore the control state of the environmental equipment to a state before change within a predetermined change time period after changing the control state of the environmental equipment.

3. The environmental equipment control apparatus according to claim 2, wherein
    the predetermined change time period is 30 minutes or less.

4. The environmental equipment control apparatus according to claim 1, wherein
    the environmental equipment includes an air conditioning apparatus capable of changing a temperature of a space where the user is present, and
    in a case in which the physical-and-mental-state information satisfies the predetermined state condition, the control unit causes the air conditioning apparatus to operate with a set temperature being decreased and then causes the air conditioning apparatus to operate with the set temperature before being changed.

5. The environmental equipment control apparatus according to claim 4, wherein
    the air conditioning apparatus is capable of adjusting a blow-out direction of conditioned air, and
    in a case in which the physical-and-mental-state information satisfies the predetermined state condition, the control unit controls the blow-out direction of the conditioned air of the air conditioning apparatus to a predetermined downward state in a case of causing the air conditioning apparatus to operate with the set temperature being decreased.

6. The environmental equipment control apparatus according to claim 4, wherein
    the air conditioning apparatus is capable of changing a speed of conditioned air to be supplied to the user, and
    the control unit controls the air conditioning apparatus to cause variation in the speed of the conditioned air to be supplied to the user when starting changing the control state of the environmental equipment in response to the physical-and-mental-state information satisfying the predetermined state condition.

7. The environmental equipment control apparatus according to claim 4, wherein
    the air conditioning apparatus is capable of changing a humidity of the space where the user is present, and
    the control unit decreases a set humidity of the air conditioning apparatus when starting changing the control state of the environmental equipment in response to the physical-and-mental-state information satisfying the predetermined state condition.

8. The environmental equipment control apparatus according to claim 4, wherein
    the environmental equipment further includes aroma equipment that provides an aroma to the space where the user is present, and
    the control unit causes the aroma equipment to start providing an aroma or increases an amount of aroma to be provided by the aroma equipment when starting changing the control state of the environmental equipment in response to the physical-and-mental-state information satisfying the predetermined state condition.

9. The environmental equipment control apparatus according to claim 4, wherein
    the environmental equipment includes ventilating equipment capable of ventilating the space where the user is present, and
    the control unit increases a ventilation amount of the ventilating equipment when starting changing the control state of the environmental equipment in response to the physical-and-mental-state information satisfying the predetermined state condition.

10. The environmental equipment control apparatus according to claim 4, wherein
the environmental equipment includes illuminating equipment capable of changing an illuminance of the space where the user is present, and
the control unit increases an illuminance of the illuminating equipment when starting changing the control state of the environmental equipment in response to the physical-and-mental-state information satisfying the predetermined state condition.

11. The environmental equipment control apparatus according to claim 4, wherein
the environmental equipment includes illuminating equipment capable of changing a color temperature of the space where the user is present, and
the control unit increases a color temperature of the illuminating equipment when starting changing the control state of the environmental equipment in response to the physical-and-mental-state information satisfying the predetermined state condition.

12. The environmental equipment control apparatus according to claim 1, wherein
the physical-and-mental-state information includes a drowsiness scale of the user.

13. The environmental equipment control apparatus according to claim 12, wherein
in a case in which the drowsiness scale of the user is greater than or equal to a predetermined sleepiness reference value, the control unit changes the control state of the environmental equipment.

14. An environmental equipment control system including the environmental equipment control apparatus according to claim 1, the environment equipment control system further comprising:
the environmental equipment.

15. An environmental equipment control apparatus for controlling environmental equipment, the environmental control apparatus comprising:
a grasping unit configured to grasp physical-and-mental-state information about a physical and mental state of a user;
a control unit configured to change a control state of the environmental equipment in a case in which the physical-and-mental-state information satisfies a predetermined state condition; and
a storage unit configured to store correspondence information in which changes in the control state of the environmental equipment are associated with changes in the physical-and-mental-state information of the user grasped by the grasping unit responsive to the changes in the control state of the environmental equipment,
the control unit being capable of
changing a manner of changing the control state of the environmental equipment every time the physical-and-mental-state information satisfies the predetermined state condition,
selecting a change satisfying a predetermined change condition from the changes in the physical-and-mental-state information of the user, and
executing a change in the control state of the environmental equipment stored in association with the selected change,
the environmental equipment including an air conditioning apparatus capable of changing a temperature of a space where the user is present, and
in a case in which the physical-and-mental-state information satisfies the predetermined state condition,
the control unit causes the air conditioning apparatus to operate with the set temperature being decreased by a predetermined temperature value and then
the control unit repeats a process of causing the air conditioning apparatus to operate with the set temperature being increased by a temperature value smaller than the predetermined temperature value until the set temperature is back to a previous set temperature before being decreased.

16. An environmental equipment control apparatus for controlling environmental equipment, the environmental control apparatus comprising:
a grasping unit configured to grasp physical-and-mental-state information about a physical and mental state of a user;
a control unit configured to change a control state of the environmental equipment in a case in which the physical-and-mental-state information satisfies a predetermined state condition; and
a storage unit configured to store correspondence information in which changes in the control state of the environmental equipment are associated with changes in the physical-and-mental-state information of the user grasped by the grasping unit responsive to the changes in the control state of the environmental equipment,
the control unit being capable of
changing a manner of changing the control state of the environmental equipment every time the physical-and-mental-state information satisfies the predetermined state condition,
selecting a change satisfying a predetermined change condition from the changes in the physical-and-mental-state information of the user, and
executing a change in the control state of the environmental equipment stored in association with the selected change,
the environmental equipment including an air conditioning apparatus capable of changing a temperature of a space where the user is present, and
in a case in which the physical-and-mental-state information satisfies the predetermined state condition, the control unit causes the air conditioning apparatus to operate with a set temperature being decreased and then causes the air conditioning apparatus to operate with the set temperature before being changed, the control unit increasing a degree of decrease in the set temperature of the air conditioning apparatus more as an outdoor temperature decreases.

* * * * *